US012596777B2

(12) United States Patent
Chun et al.

(10) Patent No.: US 12,596,777 B2
(45) Date of Patent: Apr. 7, 2026

(54) METHOD, DEVICE, AND STORAGE MEDIUM FOR USER AUTHENTICATION

(71) Applicant: Samsung Electronics Co., Ltd., Suwon-si (KR)

(72) Inventors: Jinwook Chun, Suwon-si (KR); Valeriy Prushinskiy, Suwon-si (KR); Sungoh Kim, Suwon-si (KR); Hyungsok Yeo, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 286 days.

(21) Appl. No.: 18/467,169

(22) Filed: Sep. 14, 2023

(65) Prior Publication Data

US 2024/0004980 A1 Jan. 4, 2024

Related U.S. Application Data

(63) Continuation of application No. PCT/KR2022/000702, filed on Jan. 14, 2022.

(30) Foreign Application Priority Data

Mar. 15, 2021 (KR) ........................ 10-2021-0033206

(51) Int. Cl.
  *G06F 21/32* (2013.01)
  *G06V 10/60* (2022.01)
  (Continued)

(52) U.S. Cl.
  CPC .............. *G06F 21/32* (2013.01); *G06V 10/60* (2022.01); *G06V 40/193* (2022.01); *G06V 40/45* (2022.01)

(58) Field of Classification Search
  CPC .......... G06F 21/32; G06F 21/31; G06F 21/45; G06F 21/79; G06V 10/60; G06V 40/193;
  (Continued)

(56) References Cited

U.S. PATENT DOCUMENTS

2007/0120879 A1  5/2007  Kanade et al.
2007/0122009 A1  5/2007  Jee et al.
(Continued)

FOREIGN PATENT DOCUMENTS

CN      108983872 A    12/2018
CN      109308866 A    2/2019
(Continued)

OTHER PUBLICATIONS

Korean Office Action issued Apr. 28, 2025 in corresponding Korean Patent Application No. 10-2021-0033206.
(Continued)

*Primary Examiner* — Andrae S Allison
(74) *Attorney, Agent, or Firm* — Nixon & Vanderhye P.C.

(57) ABSTRACT

According to various embodiments, an electronic device may comprise: a memory; a display; a plurality of cameras disposed below the display; and at least one processor operatively connected to the memory, the display, and the plurality of cameras, wherein the at least one processor is configured to, while controlling a plurality of pixel areas of the display, which correspond to the plurality of cameras, acquire a plurality of images of a user through the plurality of cameras, obtain a final image based on at least one image among the plurality of images, and authenticate the user based on the final image.

20 Claims, 11 Drawing Sheets

(51) Int. Cl.
  *G06V 40/18*   (2022.01)
  *G06V 40/40*   (2022.01)

(58) Field of Classification Search
  CPC ...... G06V 40/45; G06V 40/172; G06V 40/18;
     G06V 10/12; G06V 40/16; G06V 40/50;
                G06T 5/50
  See application file for complete search history.

(56)      References Cited

U.S. PATENT DOCUMENTS

| | | | |
|---|---|---|---|
| 2014/0028823 A1 | 1/2014 | Tahk et al. | |
| 2014/0146127 A1 | 5/2014 | He et al. | |
| 2017/0084231 A1 | 3/2017 | Chew | |
| 2018/0210493 A1 | 7/2018 | Bao | |
| 2018/0211097 A1 | 7/2018 | Wang | |
| 2018/0276468 A1* | 9/2018 | Lee ........................ | G06V 40/63 |
| 2019/0080189 A1 | 3/2019 | Van Os et al. | |
| 2020/0184059 A1 | 6/2020 | Wu et al. | |
| 2020/0226396 A1 | 7/2020 | He et al. | |
| 2020/0258967 A1 | 8/2020 | Kim et al. | |
| 2021/0152734 A1* | 5/2021 | Zhou ...................... | H04N 23/64 |
| 2021/0280109 A1 | 9/2021 | Xie | |
| 2022/0116519 A1* | 4/2022 | Nikhara ................. | H04N 23/57 |
| 2022/0116546 A1* | 4/2022 | Gummadi .............. | G06T 13/80 |

FOREIGN PATENT DOCUMENTS

| | | |
|---|---|---|
| CN | 110554738 A | 12/2019 |
| KR | 20070055653 A | 5/2007 |
| KR | 20160147943 A | 12/2016 |
| KR | 20180047330 A | 5/2018 |
| KR | 20180071046 A | 6/2018 |
| KR | 20200128454 A | 11/2020 |

OTHER PUBLICATIONS

International Search Report for PCT/KR2022/000702 mailed Apr. 27, 2022, 6 pages.
Written Opinion of the ISA for PCT/KR2022/000702 mailed Apr. 27, 2022, 4 pages.

\* cited by examiner

700

Size of pupil ↑ in small amount of light

Size of pupil ↓ in large amount of light

800

801

812

814

Lock mode

Face recognition and
biometric authentication

Release lock mode

METHOD, DEVICE, AND STORAGE MEDIUM FOR USER AUTHENTICATION

CROSS-REFERENCE TO RELATED APPLICATIONS

This application is a continuation of International Application No. PCT/KR2022/000702 designating the United States, filed on Jan. 14, 2022, in the Korean Intellectual Property Receiving Office and claiming priority to Korean Patent Application No. 10-2021-0033206, filed on Mar. 15, 2021, in the Korean Intellectual Property Office, the disclosures of each of which are incorporated by reference herein in their entireties.

BACKGROUND

Field

The disclosure relates to a method, a device, and a storage medium for user authentication.

Description of Related Art

An electronic device such as a smartphone or a tablet terminal may have a camera generally disposed on the front surface of the electronic device equipped with a display thereon in order to provide a selfie function or a video call function.

The camera, which is disposed in the upper front portion of the electronic device, is evolving to be placed under the display to improve screen size efficiency and a visual immersion experience. For example, in an electronic device, an under-display camera (UDC) capable of maximizing and/or increasing the immersion experience by disposing a camera under the display such that the camera is not visible, has been proposed.

The UDC may be visible on the display screen when it is operated and may not be visible on the display screen when it is not operated, thereby enabling implementation of a full display.

A transparent area of the display, which may be disposed at a position corresponding to the UDC, may include pixels configured to use a passive matrix driving method. These structural features may make it difficult for an electronic device including the UDC to obtain high-quality images.

In addition, a plurality of elements (e.g., organic light-emitting diodes (OLEDs), thin film transistors (TFTs), or electrical wires) for the display may be provided above the UDC, thereby directly interfering with optical paths above the UDC or blocking the path of light incident from the outside. Therefore, images collected by the UDC may require a post-processing procedure for improving the images with various interference factors.

Consequently, compared to the general cameras of an electronic devices at least a portion of which is exposed to the outside, quality degradation of the images collected through the UDC is inevitable, and reliability of various functions related to the images, such as user face authentication or a preview mode, may be lowered.

SUMMARY

Embodiments of the disclosure may make it possible to reduce the quality degradation of the images collected by the UDC in an electronic device and increase the reliability of user face authentication.

According to various example embodiments, an electronic device may include: a memory, a display, a plurality of cameras disposed under the display, and at least one processor operatively connected to the memory, the display, and the plurality of cameras, wherein the at least one processor may be configured to: obtain a plurality of images of a user through the plurality of cameras while controlling a plurality of pixel areas of the display corresponding to the plurality of cameras, obtain a final image, based on at least one of the plurality of images, and perform authentication of the user, based on the final image.

According to various example embodiments, a method of performing user authentication in an electronic device may include: obtaining a plurality of images of a user through a plurality of cameras disposed under a display while controlling a plurality of pixel areas of the display corresponding to the plurality of cameras, obtaining a final image, based on at least one of the plurality of images, and performing authentication of the user, based on the final image.

According to various example embodiments, a non-transitory computer-readable storage medium may store instructions that, when executed by at least one processor, cause an electronic device to perform at least one operation, the at least one operation may include: obtaining a plurality of images of a user through a plurality of cameras disposed under a display while controlling a plurality of pixel areas of the display corresponding to the plurality of cameras, obtaining a final image, based on at least one of the plurality of images, and performing authentication of the user, based on the final image.

According to various example embodiments, the quality of images collected by the UDC may be improved, and the reliability of user face authentication may be increased.

According to various example embodiments, simple and highly reliable biometric authentication may be possible.

According to various example embodiments, a variety of information obtainable in the process of collecting images through at least two UDCs may be utilized as criteria for determining authenticity required for face authentication, thereby improving reliability of authentication.

According to various example embodiments, during photographing by one UDC, pixels disposed above another UDC may be used a point light source so that an image with adjusted brightness may be obtained.

BRIEF DESCRIPTION OF THE DRAWINGS

The above and other aspects, features and advantages of certain embodiments of the present disclosure may be more apparent from the following detailed description, taken in conjunction with the accompanying drawings, in which.

3

Figure 7A:
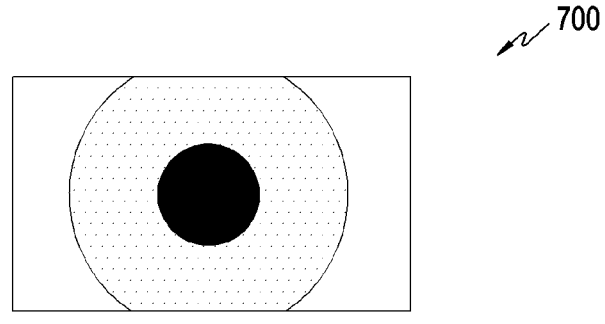
Figure 7B:
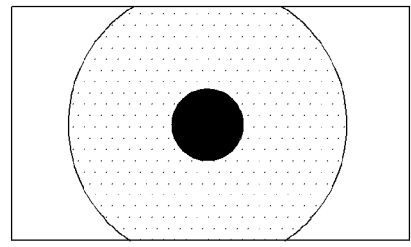
Figures 8A, 8B, 8C:
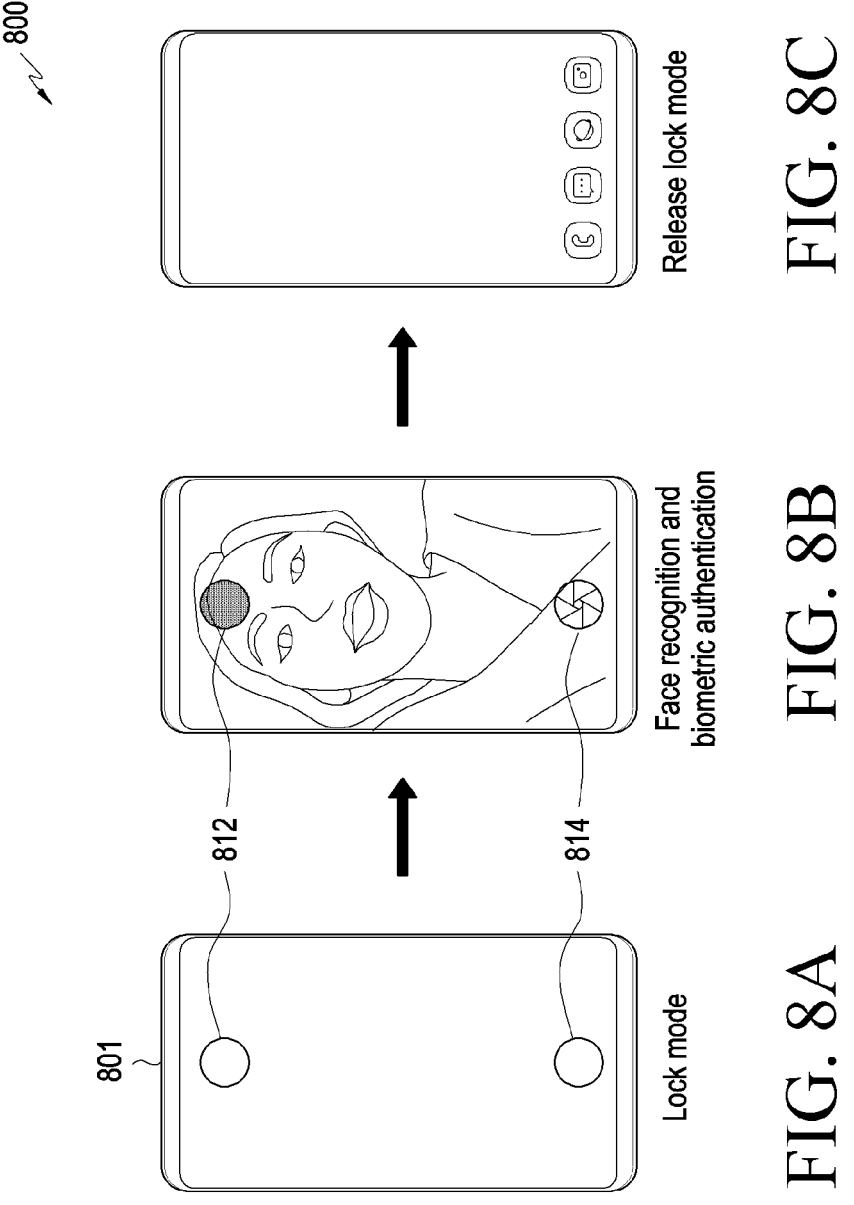
Figure 10:
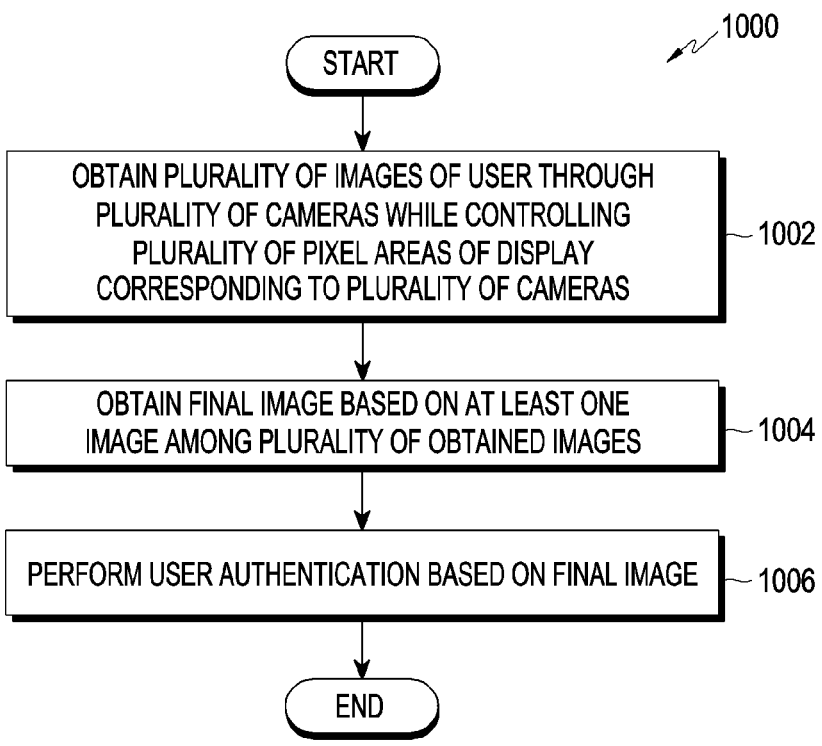
Figure 11:
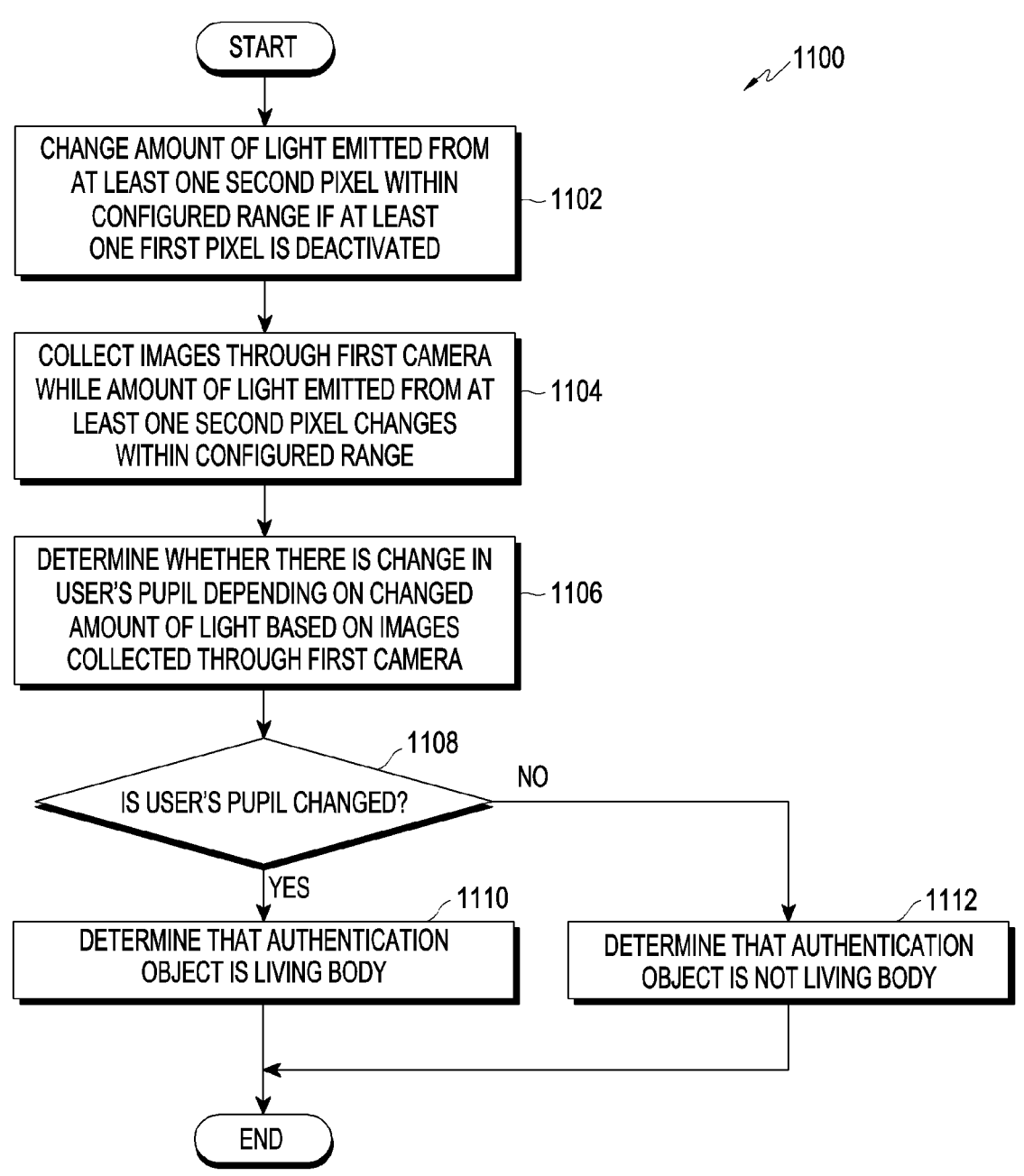
Figure 12:
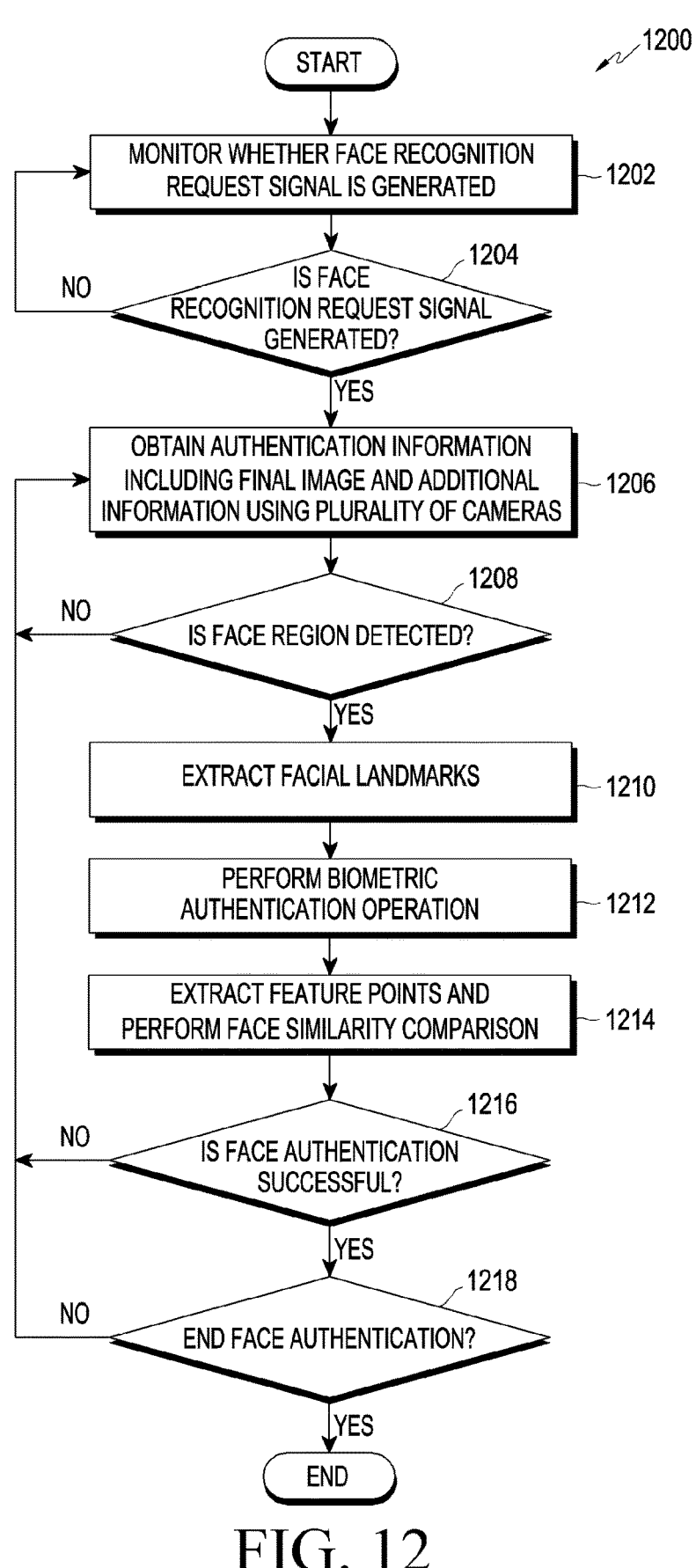

FIGS. 7A and 7B are diagrams illustrating a change in pupil size depending on a change in the amount of light according to various embodiments;

FIGS. 8A, 8B and 8C are diagrams illustrating an example operation of releasing a lock mode from an electronic device according to various embodiments;

FIGS. 9A, 9B, 9C and 9D are diagrams illustrating an example operation of providing a preview image in an electronic device according to various embodiments;

FIG. 10 is a flowchart illustrating an example method of performing user authentication according to various embodiments;

FIG. 11 is a flowchart illustrating an example method of performing a biometric authentication operation according to various embodiments; and FIG. 12 is a flowchart illustrating an example method of performing user authentication according to various embodiments.

DETAILED DESCRIPTION

Figure 1:
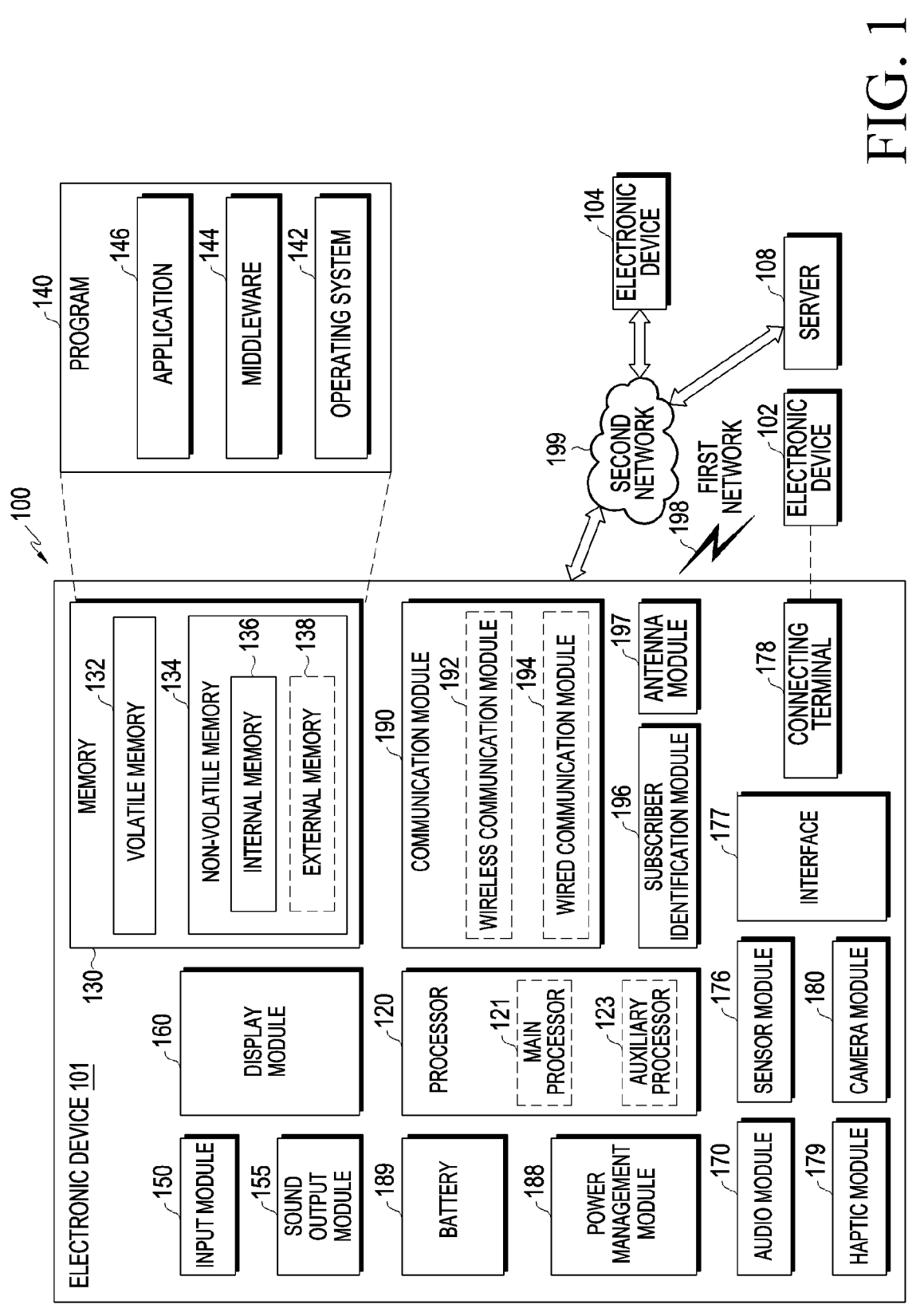
FIG. 1 is a block diagram illustrating an example electronic device in a network environment according to various embodiments.

FIG. 1 is a block diagram illustrating an example electronic device 101 in a network environment 100 according to embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
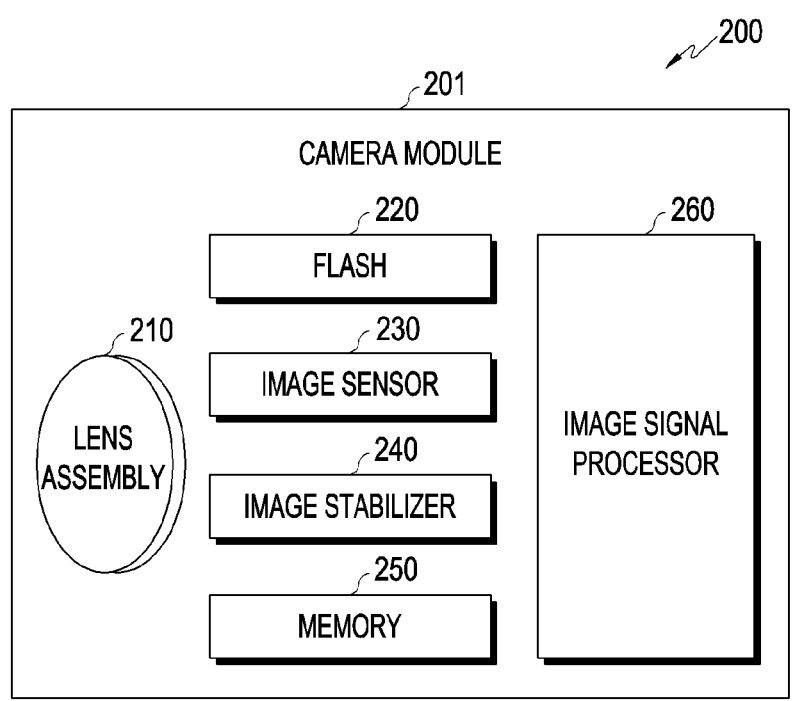
FIG. 2 is a block diagram illustrating an example configuration of a camera module according to various embodiments.

FIG. 2 is a block diagram 200 illustrating an example configuration of camera module 201 (e.g., the camera module 180 from FIG. 1) according to various embodiments. Referring to FIG. 2, the camera module 201 may include a lens assembly 210, a flash 220, an image sensor 230, an image stabilizer 240, a memory 250 (e.g., buffer memory), and/or an image signal processor (e.g., including image processing circuitry) 260. The lens assembly 210 may collect light emitted or reflected from an object whose image is to be taken. The lens assembly 210 may include one or more lenses. According to an embodiment, the camera module 201 may include a plurality of lens assemblies 210. In such a case, the camera module 201 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to the various embodiments, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to the various embodiments, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 201 or the electronic device 201 including the camera module 201. This allows compensating for at least part of a negative effect (e.g., image blurring) by the movement on an image being captured. According to the various embodiments, the image stabilizer 240 may sense such a movement by the camera module 201 or the electronic device 201 using a gyro sensor (not shown) or an acceleration sensor (not shown) disposed inside or outside the camera module 201. According to the various embodiments, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 260. Thereafter, if a specified condition is met (e.g., by a user's input or system command), at least part of the raw image stored in the memory 250 may be obtained and processed, for example, by the image signal processor 260. According to the various embodiments, the memory 250 may be configured as at least part of the memory 230 or as a separate memory that is operated independently from the memory 230.

The image signal processor 260 may include various image signal processing circuitry and perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 201. An image processed by the image signal processor 260 may be stored back in the memory 250 for further processing, or may be provided to an external component (e.g., the memory 130, the display module 160, the electronic device 102, the electronic device 104, or the server 108) outside the camera module 201. According to an embodiment, the image signal processor 260 may be configured as at least part of the processor 220, or as a separate processor that is operated independently from the processor 220. If the image signal processor 260 is configured as a separate processor from the processor 220, at least one image processed by the image signal processor 260 may be displayed, by the processor 220, via the display device 260 as it is or after being further processed.

According to an embodiment, the electronic device 201 may include a plurality of camera modules 201 having different attributes or functions. In such a case, at least one of the plurality of camera modules 201 may form, for example, a wide-angle camera and at least another of the plurality of camera modules 201 may form a telephoto camera. Similarly, at least one of the plurality of camera modules 201 may form, for example, a front camera and at least another of the plurality of camera modules 201 may form a rear camera.

Figure 3:
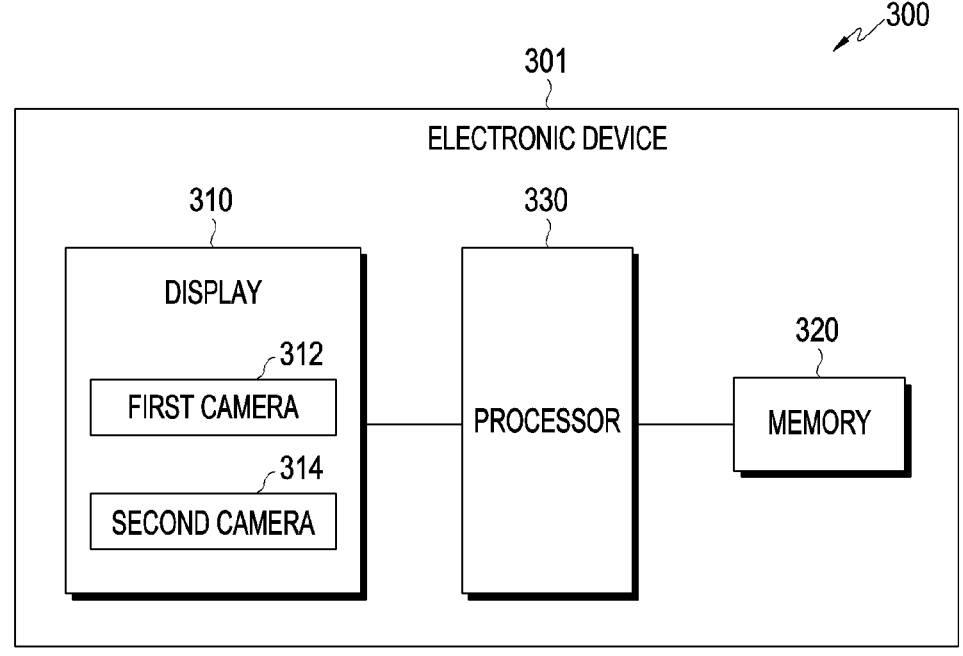
FIG. 3 is a block diagram illustrating an example configuration of an electronic device according to various embodiments.

FIG. 3 is a block diagram 300 illustrating an example configuration of an electronic device according to various embodiments.

Referring to FIG. 3, an electronic device 301 may include a display 310, a first camera 312, a second camera 314, a memory 320, and a processor (e.g., including processing circuitry) 330.

According to various embodiments, the electronic device 301 is not limited to the configurations shown in FIG. 3 and may be implemented to include more elements or fewer elements. For example, the electronic device 301 may be implemented to further include the elements described with reference to FIG. 1 or FIG. 2. The electronic device 301 according to various embodiments may be the electronic device 101 in FIG. 1 or an electronic device to be described below.

In an embodiment, the display 310 may display at least one of information produced by the processor 330, images collected by the first camera 312 or the second camera 314, or messages to be provided to a user. Information displayed on the display 310 is not limited to the above examples.

In an embodiment, the display 310 may control pixels on the display 310, based on at least one of a passive matrix driving method or an active matrix driving method, thereby performing a display operation. The display 310 may be included in the display module 160 in FIG. 1.

In an embodiment, the first camera 312 and the second camera 314 may be UDCs disposed under the display 310. In an embodiment, the first camera 312 and the second camera 314 may be disposed at different positions. For example, when viewing the display 310 from the front, the first camera 312 may be disposed on the upper portion of the display 310, and the second camera 314 may be disposed on the lower portion of the display 310. The upper portion of the display 310 may refer to a portion relatively close to the sound output module 155 (or speaker), and the lower portion of the display 310 may refer to a portion relatively far from the sound output module 155 (or speaker). As another example, when viewing the display 310 from the front, the first camera 312 may be disposed on the right portion in the display 310, and the second camera 314 may be disposed on the left portion in the display 310. The positions of the first camera 312 and the second camera 314, not limited to the above examples, may be vary.

According to an embodiment, although FIG. 3 shows that two cameras (e.g., the first camera 312 and the second camera 314) are included in the electronic device 301, more than two cameras may also be included in the electronic device 301.

In an embodiment, at least one of the first camera 312 or the second camera 314 may be included in the camera module 180 in FIG. 1 or the camera module 201 in FIG. 2.

In an embodiment, the memory 320 may store information produced by the processor 330, information for a face authentication operation, commands, and/or indicators. The memory 320 may store at least one of an image collected by the first camera 312 or the second camera 314, information about the camera that obtained the collected image, among the first camera 312 and the second camera 314 (e.g., at least one piece of camera identification information, camera position information, or camera configuration information), information about the time of obtaining the collected image, or interference information included in the collected image.

In an embodiment, the memory 320 may include volatile memory or non-volatile memory, and may be included in the memory 130 in FIG. 1.

In an embodiment, the processor 330 may include one or more processors.

In an embodiment, the processor 330 may be included in the processor 120 in FIG. 1.

In an embodiment, the processor 330 may include various processing circuitry (as used herein, including the claims, the term "processor" may include various processing circuitry, including at least one processor, wherein one or more processors of the at least one processor may be configured to perform the various functions described herein) and control the display 310, the first camera 312, the second camera 314, and the memory 320 to perform operations executed in an electronic device according to various embodiments to be described in greater detail below.

Figure 4:
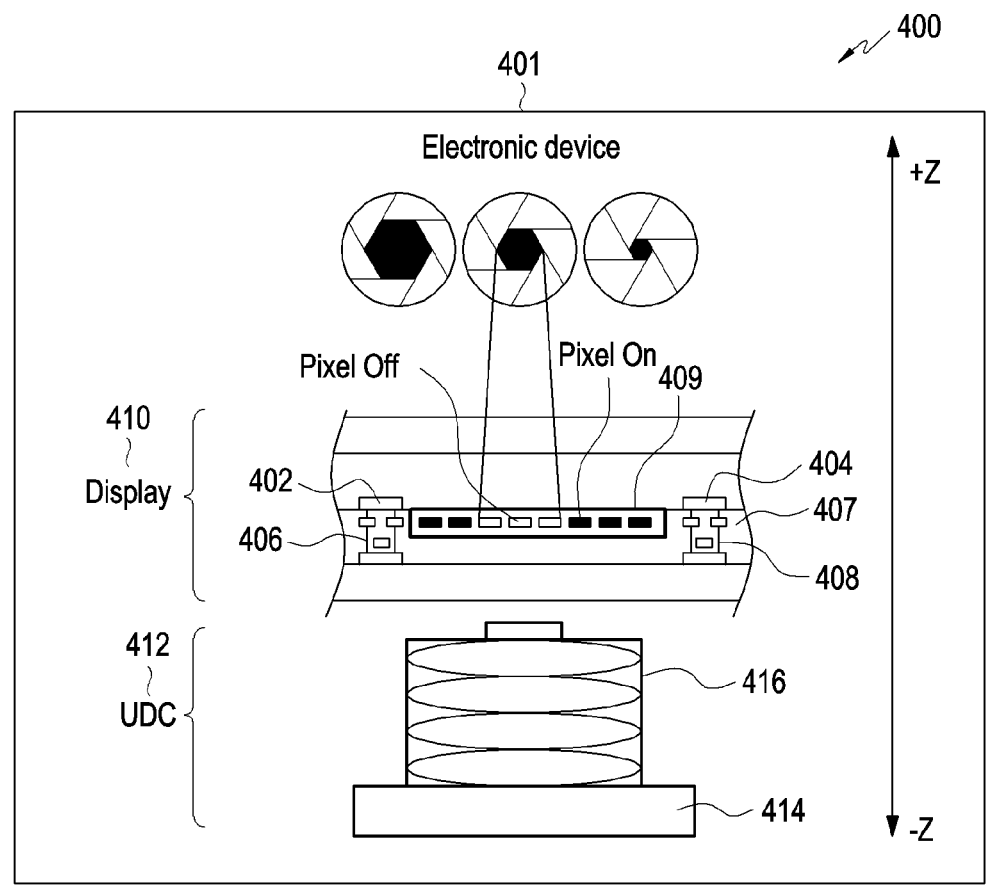
FIG. 4 is a diagram illustrating a camera and display pixels above the camera according to various embodiments.

FIG. 4 is a diagram 400 illustrating a camera and display pixels above the camera according to various embodiments.

Referring to FIG. 4, an electronic device 401 may include a display 410 and a UDC 412 including a camera disposed under the display 410. The electronic device 401 may be the electronic device (e.g., the electronic device 101 and the electronic device 301) shown in FIGS. 1 and 3, and the display 410 may be included in the display module 160 in FIG. 1 and may be the display 310 in FIG. 3. The UDC 412 may be included in the camera module 180 in FIG. 1 and the camera module 201 in FIG. 2, and may be the first camera 312 or the second camera 314 in FIG. 3.

In an embodiment, the UDC 412 may be disposed below the display 410 so as to overlap at least a portion of the display 410 when viewed from above of the display 410 (e.g., in the −z-axis direction), thereby obtaining an image of an external subject without being exposed to the outside.

In an embodiment, the UDC 412 may include an image sensor 414 for obtaining an image corresponding to a subject and a lens assembly 416 including one or more lenses. The image sensor 414 and the lens assembly 416 may correspond to the image sensor 230 and the lens assembly 210 in FIG. 2.

In an embodiment, the display 410 may include a plurality of pixels 409. The plurality of pixels 409 may include passive matrix organic light-emitting diode (PMOLED) pixels driven based on a passive matrix driving method or active matrix organic light-emitting diode (AMOLED) pixels driven based on an active matrix driving method.

Each of the AMOLED pixels may configured as a plurality of elements. For example, one AMOLED pixel may include an organic light-emitting diode (OLED) 402 or 404, a thin film transistor (TFT) 406 or 408 for controlling driving of the OLED 402 or 404, and an insulation layer (IL) 407 between the OLED 402 or 404 and the TFT 406 or 408. The AMOLED pixels may be applied with voltage for each pixel by the TFT 406 or 408. Accordingly, the AMOLED pixels may be activated or deactivated by providing an electrical signal (e.g., a signal instructing activation of a pixel or deactivation of a pixel) for each pixel, or the amount of light may be controlled for each pixel.

The PMOLED pixels may be configured in a form in which OLEDs with diode characteristics are disposed between matrix-type electrodes. The PMOLED pixels may include OLEDs that is operated by electric signals at a designated time to emit light for each line without TFT, thereby controlling the pixels for each line.

According to an embodiment, if at least one pixel among a plurality of pixels 409 is deactivated, a display pixel area where the at least one pixel is disposed may become transparent. Based on this, the plurality of pixels 409 may be electrically controlled to act as an aperture of the UDC 412. For example, as the number of deactivated pixels among the plurality of pixels 409 increases, the transparent display pixel area increases, so that the amount of light passing through the transparent display pixel area and incident on the UDC 412 may increase. On the other hand, as the number of activated pixels among the plurality of pixels 409 increases, the transparent display pixel area decreases, so that the amount of light passing through the transparent display pixel area and incident on the UDC 412 may be reduced.

In an embodiment, the plurality of pixels 409 may be electrically controlled for a biometric authentication operation. For example, as the number of deactivated pixels among the plurality of pixels 409 increases, the amount of light radiated on the display area may be reduced, and as the number of activated pixels among the plurality of pixels 409 increases, the amount of light radiated on the display area may increase. Since the size of the user's pupil may vary based on the amount of light, the plurality of pixels 409 may be controlled to adjust the amount of light for biometric authentication.

According to an embodiment, the plurality of pixels 409 may be activated for operation as lights. For example, the plurality of pixels 409 may be activated and operated as lights to emit light to the face area when the illumination around the face is low in the face authentication operation. Since a large amount of light may cause glare to the user, the plurality of pixels 409 disposed above the UDC 412 on the vertical surface thereof may be controlled as a point light source, thereby providing light necessary for face authentication without glare.

According to various example embodiments, an electronic device (e.g., the electronic device 101 in FIG. 1, the electronic device 301 in FIG. 3, or the electronic device 401 in FIG. 4) may include: a memory (e.g., the memory 130 in FIG. 1 or the memory 320 in FIG. 3), a display (e.g., the display module 160 in FIG. 1 or the display 310 in FIG. 3), a plurality of cameras (e.g., the first camera 312 and the second camera 314 in FIG. 3) disposed under the display, and at least one processor (e.g., the processor 330 in FIG. 3) operatively connected to the memory, the display, and the plurality of cameras, wherein the at least one processor may be configured to: obtain a plurality of images of a user through the plurality of cameras while controlling a plurality of pixel areas of the display corresponding to the plurality of cameras, obtain a final image, based on at least one of the plurality of obtained images, and perform authentication of the user, based on the final image.

In an example embodiment, the at least one processor may be configured to: alternately activate or deactivate at least one first pixel included in a first pixel area among the plurality of pixel areas and at least one second pixel included in a second pixel area among the plurality of pixel areas, obtain at least one first image of the user through a first camera disposed under the first pixel area, among the plurality of cameras, while the at least one first pixel is deactivated, and obtain at least one second image of the user through a second camera disposed under the second pixel area, among the plurality of cameras, while the at least one second pixel is deactivated.

In an example embodiment, the at least one processor may be configured to obtain, as the final image, an image having a least interference from among the at least one first image and the at least one second image.

In an example embodiment, the at least one processor may be configured to obtain, as the final image, an image produced by integrating a portion of the at least one first image with the least interference and a portion of the at least one second image with the least interference.

In an example embodiment, the at least one processor may be configured to: obtain at least one third image of the user through the first camera while the at least one first pixel is activated, obtain at least one fourth image of the user through the second camera while the at least one second pixel is activated, and use interference information included in each of the at least one third image and the at least one fourth image as additional information for performing the authentication.

In an example embodiment, the at least one processor may be configured to: identify whether a surrounding brightness value of the first pixel area is less than a threshold value based on the at least one first pixel being deactivated, control at least one second pixel included in the second pixel area to emit a configured amount of light based on the surrounding brightness value of the first pixel area being less than the threshold value, and obtain at least one first image of the user through the first camera disposed under the first pixel area while the at least one second pixel is emitting the light.

In an example embodiment, the at least one processor may be configured to: change the amount of light emitted from the at least one second pixel within a configured range based on the at least one first pixel being deactivated, collect images through the first camera while the amount of light is changed within the configured range, determine whether there is a change in the pupil of the user depending on the changed amount of light, based on the collected images, and determine whether an authentication object is a living body, based on the determination result.

Hereinafter, various example operations of an electronic device according to various embodiments will be described. Operations of an electronic device according to various embodiments to be described with reference to FIGS. 5 to 12 may be performed by an electronic device (e.g., the electronic device 101 in FIG. 1, the electronic device 301 in FIG. 3, or the electronic device 401 in FIG. 4), at least one processor (e.g., the processor 330 in FIG. 3), or a combination thereof. Hereinafter, an example in which the operations shown in FIGS. 5 to 12 are performed by an electronic device will be described.

A plurality of cameras or an upper UDC and a lower UDC, which will be described in FIGS. 5 to 12, may be included in the camera module 180 in FIG. 1 and the camera module 201 in FIG. 2, may be the first camera 312 and the second camera 314 in FIG. 3, and may have the same configurations as the UDC 412 in FIG. 4, respectively.

Figure 5:
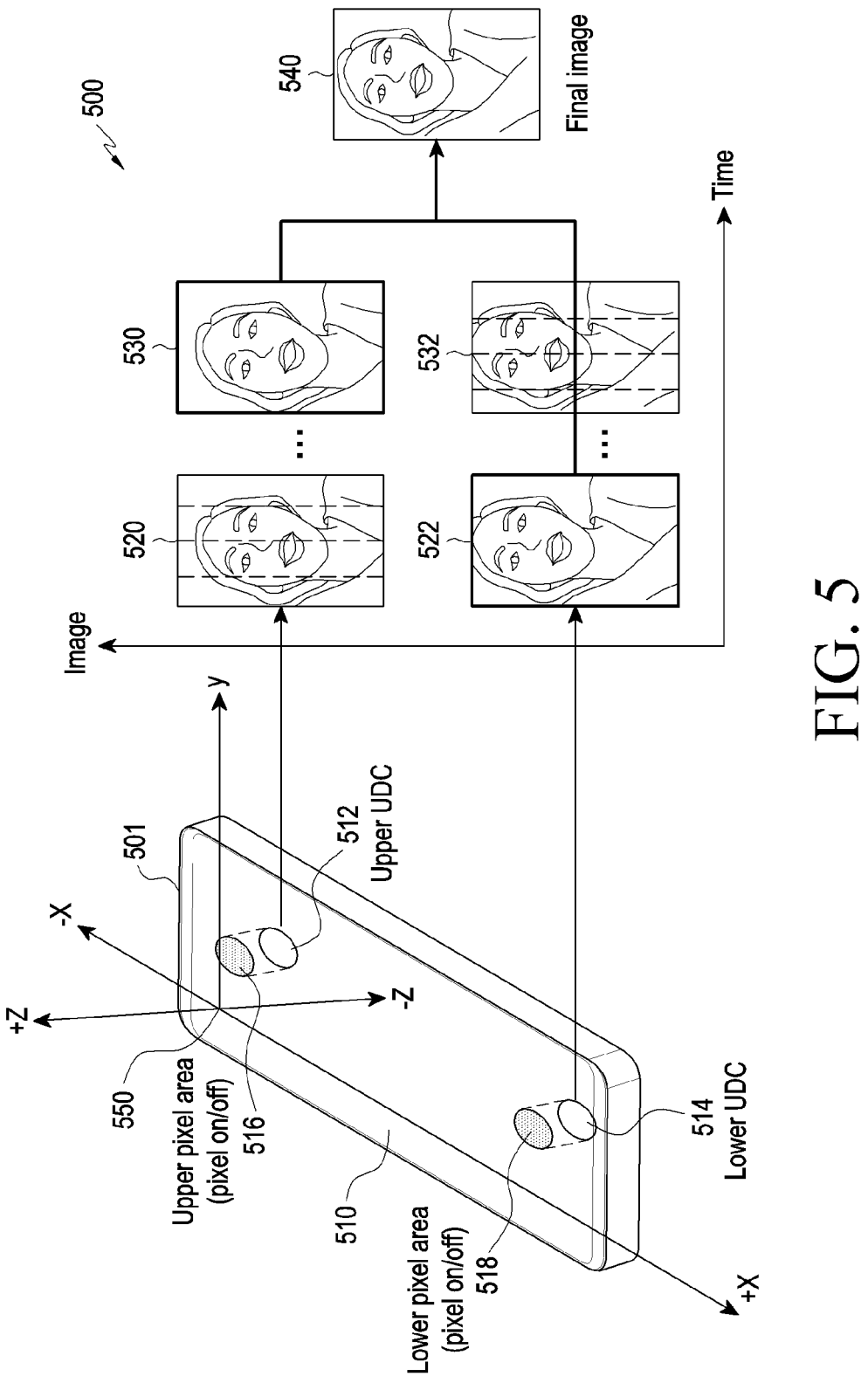
FIG. 5 is a diagram illustrating an example operation of obtaining an image using a plurality of cameras according to various embodiments.

FIG. 5 is a diagram 500 illustrating an example operation of obtaining an image using a plurality of cameras according to various embodiments.

Referring to FIG. 5, in an embodiment, an electronic device 501 may include a display 510, an upper UDC 512, and a lower UDC 514. When viewing the display 510 from the front (e.g., when viewing in the −z-axis direction), the upper UDC 512 may indicate a UDC disposed below an upper pixel area 516 of the display 510, and the lower UDC 514 may indicate a UDC disposed below a lower pixel area 518 of the display 510. In the display 510, the upper pixel area 516 may include an area where the upper UDC 512 is disposed below one area of the entire area of the display 510 or at least one area corresponding to the field of view of the upper UDC 512. In the display 510, the lower pixel area 518 may include an area where the lower UDC 514 is disposed below one area of the entire area of the display 510 or at least one area corresponding to the field of view of the lower UDC 514. In the display 510, the upper pixel area 516 may indicate a pixel area positioned upper than the lower pixel area 518 when viewed in the −x-axis direction, and may indicate a pixel area having the shortest distance from the origin 550, which is a starting point of the +x, −x, y, +z, and −z axes, in the +x-axis direction.

In an embodiment, in the case where the display 510 is designed as an AMOLED, control may be predetermined (e.g., specified) for each pixel. For example, when the upper UDC 512 is operated, at least one first pixel included in the upper pixel area 516 may be deactivated such that the upper pixel area 516 may become transparent.

When the lower UDC 514 is operated, at least one second pixel included in the lower pixel area 518 may be deactivated such that the lower pixel area 518 may become transparent.

In an embodiment, at least one first pixel of the upper pixel area 516 and at least one second pixel of the lower pixel area 518 may be alternately activated or deactivated. For example, if an electrical signal instructing activation of a pixel is provided to at least one first pixel, an electrical signal instructing deactivation of a pixel may be provided to at least one second pixel, and if an electrical signal instructing deactivation of a pixel is provided to at least one first pixel, an electrical signal instructing activation of a pixel may be provided to at least one second pixel. Based on this, when at least one first pixel is activated, at least one second pixel may be deactivated, and when at least one first pixel is deactivated, at least one second pixel may be activated.

In an embodiment, activation of at least one first pixel may produce a first image 520 obtained from an image collected by the upper UDC 512 and reflecting the shadow of the at least one first pixel due to the light emitted from the at least one first pixel or the interference due to diffraction of disturbance light.

In an embodiment, when at least one first pixel is deactivated, the upper pixel area 516 may become transparent. As the upper pixel area 516 becomes transparent, the light emitted from at least one first pixel is not detected by the upper UDC 512, so that a second image 530 without interference caused by the at least one first pixel may be produced by the upper UDC 512.

In an embodiment, when at least one first pixel is activated, at least one second pixel may be deactivated. When at least one second pixel is deactivated, the lower pixel area 518 may become transparent. As the lower pixel area 518 becomes transparent, the light emitted from at least one second pixel is not detected by the lower UDC 514, so that a third image 522 without interference caused by the at least one second pixel may be produced by the lower UDC 514.

In an embodiment, when at least one first pixel is deactivated, at least one second pixel may be activated. Activation of at least one second pixel may produce a fourth image 532 obtained from an image collected by the lower UDC 514 and reflecting the shadow of the at least one second pixel due to the light emitted from the at least one second pixel or the interference due to diffraction of disturbance light.

In an embodiment, since at least one first pixel and at least one second pixel are alternately activated or deactivated, substantially simultaneous photographing by the upper UDC 512 and the lower UDC 514 at different positions may produce images (e.g., the first image 520 and the third image 522, or the second image 530 and the fourth image 532) reflecting different interferences.

In an embodiment, a final image 540 may be obtained from among a plurality of images obtained by the upper UDC 512 and the lower UDC 514, based on the second image 530 obtained when at least one first pixel is deactivated and the third image 522 obtained when at least one second pixel is deactivated.

For example, an image with the least interference (e.g., an image with the highest contrast) among the second image 530 and the third image 522 may be obtained as the final image 540. As another example, an image produced by integrating a portion of the second image 530 with the least interference and a portion of the third image 522 with the least interference may be obtained as the final image 540.

In an embodiment, the final image 540 may be a reference image to be compared with an image for user authentication or an image to be authenticated. In the case where a lock mode is configured to allow only a designated user to use the electronic device, the user authentication may be, for example, face authentication for unlocking the lock mode.

In an embodiment, at least one of the UDC (e.g., the upper UDC 512 or the lower UDC 514) photographing each of images produced to obtain the final image 540, the position of each UDC, the time of obtaining each of the produced images, interference included in an image (e.g., the first image 520) produced when at least one first pixel is activated, or interferences included in an image (e.g., the fourth image 532) produced when at least one second pixel is activated may be used as additional information for face authentication, thereby contributing to higher authentication reliability.

According to an embodiment, a biometric authentication operation may be performed to determine a non-person authentication object (e.g., a 2D image or an artifact such as a mask that imitates a living body) in a face authentication operation.

Figure 6:
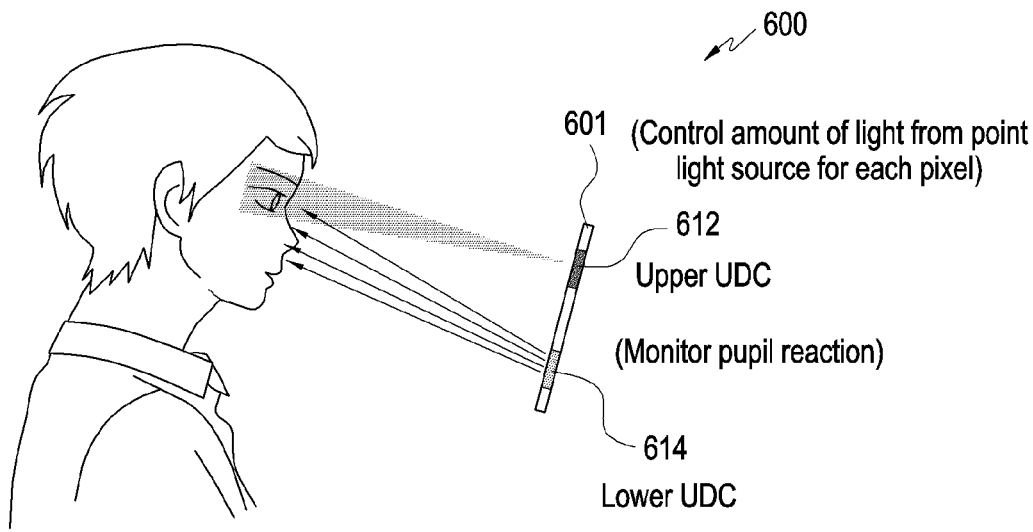
FIG. 6 is a diagram illustrating an example biometric authentication operation according to various embodiments.

FIG. 6 is a diagram 600 illustrating an example biometric authentication operation according to various embodiments.

Referring to FIG. 6, an electronic device 601 may include an upper UDC 612 and a lower UDC 614. In an embodiment, display pixels disposed above at least one of the upper UDC 612 or the lower UDC 614 may be controlled as a point light source as described in FIG. 4.

In an embodiment, the electronic device 601 may use one of at least one first pixel disposed above the upper UDC 612 and at least second pixel disposed above the lower UDC 614 as a point light source in consideration of the display output environment (e.g., background image, etc.) during user authentication, In an embodiment, the upper UDC 612 may be operated when a surrounding area (surrounding pixels) of an upper pixel area (e.g., the upper pixel area 516 in FIG. 5) including at least one first pixel has a brightness less than a threshold value, and the lower UDC 614 may be operated when a surrounding area of a lower pixel area (e.g., the lower pixel area 518 in FIG. 5) including at least one second pixel has a brightness less than a threshold value. The amount of light that may act as interference to the upper UDC 612 may increase as the surrounding area of the upper pixel area including at least one first pixel becomes brighter, and the amount of light that may act as interference to the lower UDC 614 may increase as the surrounding area of the lower pixel area including at least one second pixel becomes brighter, so the above operation may be performed to reduce the effect of interference. In an embodiment, while one of the upper UDC 612 and lower UDC 614 is operating for monitoring, the remaining UDC may be deactivated/disabled/turned off.

In an embodiment, if the surrounding area of the upper pixel area including at least one first pixel has a brightness less than a threshold value, and if a surrounding area of the lower pixel area including at least one second pixel has a brightness less than the threshold value, at least one first pixel may be used as a point light source such that the surrounding area of the upper pixel area has a brightness greater than or equal to the threshold value.

In an embodiment, the lower UDC 614 may be operated to collect an image for biometric authentication while at least one first pixel is used as a point light source. If the surrounding area of the lower pixel area has a brightness less than the threshold value, the amount of light that may act as interference to the lower UDC 614 may be less than the amount of light that may be incident on the upper UDC 612 when the upper UDC 612 is operated. Therefore, when the lower UDC 614 is operated, an image of better quality may be obtained compared to the case where the upper UDC 612 is operated.

In an embodiment, a surrounding image of the upper pixel area including at least one first pixel has a brightness greater than or equal to the threshold value, and if a surrounding image of the lower pixel area including at least one second pixel has a brightness less than the threshold value, biometric authentication may be performed through the lower UDC 614 without a separate point light source.

In an embodiment, if the brightness of the surrounding area of the upper pixel area is greater than the brightness of the surrounding area of the lower pixel area, the lower UDC 614 may be operated, and if the brightness of the surrounding area of the lower pixel area is greater than the brightness of the surrounding area of the upper pixel area, the upper UDC 612 may be operated.

In an embodiment, the biometric authentication operation may be performed by controlling the amount of light of the pixels included in the upper pixel area or the lower pixel area. The biometric authentication operation may include an operation of determining whether an authentication object is an artifact rather than a living body (e.g., human), based on whether a user's biological response is detected depending on a change in the amount of light (e.g., a change in the size of the user's pupil depending on a change in the amount of light).

In an embodiment, the upper UDC 612 or the lower UDC 614 may identify a user's biological response (e.g., pupil size change) and collect user's biological response images in real time.

In an embodiment, when the upper UDC 612 is operated for the image collection operation, at least one second pixel included in the lower pixel area may be used as a point light source by controlling the amount of light for each pixel.

In an embodiment, when the lower UDC 614 is operated for the image collection operation, at least one first pixel included in the upper pixel area may be used as a point light source by controlling the amount of light for each pixel.

In an embodiment, at least one second pixel or at least one first pixel that may be used as a point light source may emit light having a configured amount of light capable of minimizing and/or reducing user's glare.

FIGS. 7A and 7B are diagrams 700 illustrating a change in pupil size depending on a change in the amount of light according to various embodiments.

In an embodiment, the size of the user's pupil may vary based on the amount of light emitted from at least one second pixel included in the lower pixel area. For example, if the amount of light emitted from at least one second pixel is small, the size of the user's pupil may increase as shown in FIG. 7A. If the amount of light emitted from at least one second pixel is large, the size of the user's pupil may be reduced as shown in FIG. 7B.

According to an embodiment, images for identifying the size of the user's pupil, as shown in FIGS. 7A and 7B, may be collected in real time by the upper UDC. The images collected by the upper UDC may be compared with each other to be used as a basis for identifying whether there is a change in pupil size.

In an embodiment, if it is identified that there is a change in pupil size, based on the collected images, the authentication target may be determined to be a human, and if it is identified that there is no change in pupil size, based on the collected images, the authentication object may be determined to be an artifact.

FIGS. 8A, 8B and 8C are diagrams 800 illustrating an example operation of releasing a lock mode from an electronic device according to various embodiments.

Referring to FIG. 8A, an electronic device 801 including an upper UDC 812 and a lower UDC 814 may activate a lock mode. According to an embodiment, the electronic device 801 may monitor whether a face recognition request signal is generated while the lock mode is activated. The electronic device 801 may detect generation of a face recognition request signal, based on at least one of a user's action on the electronic device 801 (e.g., a user holding the electronic device 801 in his/her hand and lifting or tilting it), a touch input onto a screen of the electronic device 801, a user's voice input or a physical key input.

If a face recognition request signal is generated, the electronic device 801 may operate the upper UDC 812 to perform a biometric authentication operation of determining whether the authentication object is a human.

Referring to FIG. 8B, when the upper UDC 812 is operated, at least one first pixel of the upper pixel area may be deactivated. The upper UDC 812 may perform a face image collection operation for user face authentication. In an embodiment, if a brightness value around the upper pixel area is less than a threshold value, at least one second pixel of the lower pixel area may be activated to operate as a point light source such that the brightness value around the upper pixel area is equal to or greater than the threshold value.

In an embodiment, the electronic device 801 may control at least one first pixel and at least one second pixel to obtain a plurality of images of the user through the upper UDC 812 and the lower UDC 814. The electronic device 801 may obtain, as a final image, an image having the least interference among the plurality of images or an image produced by integrating portions of the respective images having the least interference.

Referring to FIG. 8C, if the authentication object is identified as a living body (e.g., human) as a result of the biometric authentication operation, and if a face image detected from the obtained final image corresponds to a pre-stored reference image, the lock mode may be released. If the authentication object is identified as not a living body as a result of the biometric authentication operation, and if a face image detected from the obtained final image does not correspond to a pre-stored reference image, the lock mode may remain.

FIGS. 9A, 9B, 9C and 9D are diagrams 900 illustrating an example operation of providing a preview image in an electronic device according to various embodiments.

Figures 9A, 9B, 9C, 9D:
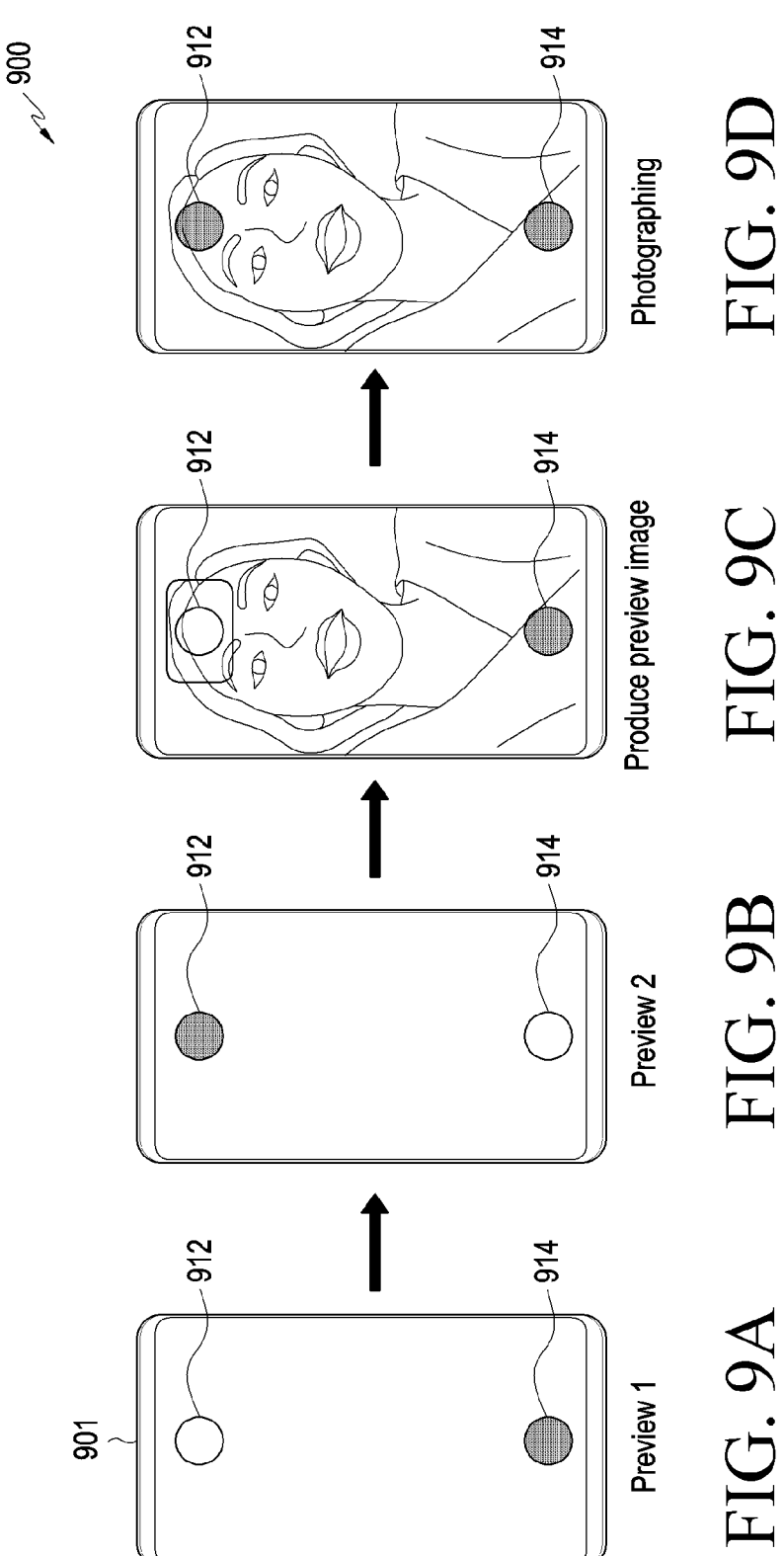

Referring to FIG. 9A, in an embodiment, an electronic device 901 may drive an upper UDC and a lower UDC when the lock mode is released and when a camera application is executed. The upper UDC and the lower UDC may be used for photography. Images obtained by the upper UDC and the lower UDC through photography may be integrated and output as a final result image.

The electronic device 901 may alternately activate or deactivate an upper pixel area 912 and a lower pixel area 914 in order to collect a high-quality preview image in a preview mode. The operation in which the electronic device 901 alternately activates or deactivates the upper pixel area 912 and the lower pixel area 914 may indicate alternately providing an electrical signal (e.g., a signal instructing activation of a pixel or deactivation of a pixel) to at least one first pixel of the upper pixel area 912 and at least one second pixel of the lower pixel area 914. The upper UDC may be disposed below the upper pixel area 912, and the lower UDC may be disposed below the lower pixel area 914. The upper pixel area 912 or the lower pixel area 914 may correspond to the upper pixel area 516 or the lower pixel area 518 in FIG. 5.

As shown in FIG. 9A, when the lower pixel area 914 is deactivated and when the upper pixel area 912 is activated, clear high-definition preview image 2 may be produced through the lower UDC.

As shown in FIG. 9B, when the upper pixel area 912 is deactivated and when the lower pixel area 914 is activated, clear high-definition preview image 1 may be produced through the upper UDC.

As a result, a high-quality preview image may be the final result image obtained by integrating the images (e.g., preview image 1 and preview image 2) respectively collected by the upper UDC and lower UDC as shown in FIG. 9C.

In an embodiment, if photographing is re-performed based on a user's selection after providing the preview image, both the upper pixel area 912 and the lower pixel area 914 may be deactivated as shown in FIG. 9D.

FIG. 10 is a flowchart 1000 illustrating an example method of performing user authentication according to various embodiments.

According to various embodiments, the operations shown in FIG. 10 are not limited to the sequence shown and may be performed in various sequences. According to various embodiments, more operations than the operations shown in FIG. 10 may be performed, or at least one operation fewer than the operations shown in FIG. 10 may be performed.

Referring to FIG. 10, in operation 1002, an electronic device (e.g., the electronic device 101 in FIG. 1 or the electronic device 301 in FIG. 3) may obtain a plurality of images of a user through a plurality of cameras (e.g., the camera module 180 in FIG. 1, the camera module 201 in FIG. 2, or the first camera 312 and the second camera 314 in FIG. 3) while controlling a plurality of pixel areas of a display (e.g., the display module 160 in FIG. 1 or the display 360 in FIG. 3) corresponding to the plurality of cameras.

In operation 1004, the electronic device may obtain a final image, based on at least one image among the plurality of obtained images.

In operation 1006, the electronic device may perform user authentication, based on the final image.

FIG. 11 is a flowchart 1100 illustrating an example method of performing a biometric authentication operation according to various embodiments.

According to various embodiments, the operations shown in FIG. 11 are not limited to the sequence shown and may be performed in various sequences. According to various embodiments, more operations than the operations shown in FIG. 11 may be performed, or at least one operation fewer than the operations shown in FIG. 11 may be performed.

Referring to FIG. 11, in operation 1102, if at least one first pixel is deactivated, an electronic device (e.g., the electronic device 101 in FIG. 1 or the electronic device 301 in FIG. 3) may change the amount of light emitted from at least one second pixel within a configured range. At least one first pixel may be included in a first pixel area disposed above a first camera (e.g., the first camera 312 in FIG. 3), and at least one second pixel may be included in a second pixel area disposed above a second camera (e.g., the second camera 314 in FIG. 3).

In operation 1104, the electronic device may collect images through the first camera while the amount of light emitted from at least one second pixel changes within the configured range.

In operation 1106, the electronic device may determine whether there is a change in the user's pupil depending on a changed amount of light, based on the images collected through the first camera.

If there is a change in the user's pupil in operation 1108, the electronic device may determine that the authentication object is a living body in operation 1110.

If there is no change in the user's pupil in operation 1110, the electronic device may determine that the authentication object is not a living body in operation 1112.

Hereinafter, an example method of performing user authentication by performing a biometric authentication operation will be described in greater detail with reference to FIG. 12.

FIG. 12 is a flowchart 1200 illustrating an example method of performing user authentication according to various embodiments.

According to various embodiments, the operations shown in FIG. 12 are not limited to the sequence shown and may be performed in various sequences. According to various embodiments, more operations than the operations shown in FIG. 12 may be performed, or at least one operation fewer than the operations shown in FIG. 12 may be performed.

Referring to FIG. 12, in operation 1202, an electronic device (e.g., the electronic device 101 in FIG. 1 or the electronic device 301 in FIG. 3) may monitor whether a face recognition request signal is generated. In an embodiment, the face recognition request signal may be generated based on at least one of a user's action on the electronic device (e.g., a user holding the electronic device in his/her hand and lifting or tilting it), a touch input onto a screen of the electronic device, a user's voice input or a physical key input. According to an embodiment, the electronic device may wait by monitoring in real time whether a face recognition request signal is generated.

In operation 1204, if a face recognition request signal is detected to be generated, the electronic device may activate a plurality of cameras (e.g., the camera module 180 in FIG. 1, the camera module 201 in FIG. 2, or the first camera 312 and the second camera 314 in FIG. 3).

In operation 1206, the electronic device may obtain authentication information including a final image and additional information using the plurality of cameras. For example, the electronic device may obtain authentication information in a manner shown in FIG. 5. In an embodiment, the plurality of cameras may be the upper UDC 512 and the lower UDC 514 in FIG. 5, and the upper pixel area 516 corresponding to the upper UDC 512 and the lower pixel area 518 corresponding to the lower UDC 514 may be alternately activated or deactivated.

In an embodiment, a plurality of images (e.g., the first image 520, the second image 530, the third image 522, and the fourth image 532) may be collected by the upper UDC 512 and the lower UDC 514 while the upper pixel area 516 and the lower pixel area 518 are alternately activated or deactivated. In an embodiment, the final image included in the authentication information may be an image with least interference, which is selected from the plurality of images.

In an embodiment, additional information included in the authentication information may include at least one piece of information about feature points of each of a plurality of images, information about the time of collecting each of the plurality of images, information about which UDC among the upper UDC 512 and the lower UDC 514 obtained each of the plurality of images, interference information included in each of the plurality of images, or position information of each of the upper UDC 512 and lower UDC 514.

In an embodiment, while the upper pixel area 516 is inactive, the upper UDC 512 may be operated, and at least one second pixel of the lower pixel area 518 may emit light as a point light source. The amount of light emitted from at least one second pixel may vary, and the images collected by the upper UDC 512 may be used as images for identifying the size of the user's pupil depending on the amount of light for a biometric authentication operation.

According to an embodiment, the electronic device may detect a face region from the final image, based on the authentication information. If the face region is not detected or the boundary of the face region is not clear in operation 1208, the electronic device may re-perform operation 1206 to obtain authentication information including a new final image.

If the face region is detected in operation 1208, the electronic device may extract facial landmarks (e.g., eyes, nose, mouth, or ears) required for face authentication in operation 1210.

In operation 1212, the electronic device may perform a biometric authentication operation, based on the extracted facial landmarks and additional information. For example, the electronic device may determine whether the object is an artifact, based on whether the pupil size of the eye extracted as a facial landmark corresponds to the amount of light at the time at which the final image was obtained.

If it is determined through the biometric authentication operation that the face region included in the final image is related to a living body, the electronic device may extract feature points required for face authentication and perform a face similarity comparison operation for face authentication in operation 1214.

In an embodiment, the face similarity comparison operation may include comparing a face region image included in the final image with a reference image of a user face region pre-registered by the user. For example, the electronic device may determine whether the reference image of a user face region corresponds to the face region image included in the final image, based on whether the feature points of the final image identified based on the additional information match the feature points extracted in operation 1214.

In an embodiment, if the reference image of a user face region corresponds to the face region image included in the final image, the electronic device may determine that face authentication is successful. If the face authentication is successful in operation 1216, the electronic device may receive a user's selection as to whether to end face authentication in operation 1218. If the face authentication is not successful in operation 1216, the electronic device may re-perform operation 1206 to obtain authentication information again.

In operation 1218, if the user selects to end face authentication, the electronic device may end the face authentication operation, and if the user selects not to end face authentication, the electronic device may re-perform operation 1206 to obtain authentication information again.

According to various example embodiments, a method of performing user authentication in an electronic device (e.g., the electronic device 101 in FIG. 1 or the electronic device 301 in FIG. 3) may include: obtaining a plurality of images of a user through a plurality of cameras (e.g., the camera module 180 in FIG. 1, the camera module 201 in FIG. 2, or the first camera 312 and the second camera 314 in FIG. 3) disposed under a display while controlling a plurality of pixel areas (e.g., the upper pixel area 516 or the lower pixel area 518 in FIG. 5, or the upper pixel area 912 or the lower pixel area 914 in FIG. 9) of the display corresponding to the plurality of cameras, obtaining a final image, based on at least one of the plurality of images, and performing authentication of the user, based on the final image.

In an example embodiment, the obtaining of the plurality of images may include: alternately activating or deactivating at least one first pixel included in a first pixel area among the plurality of pixel areas and at least one second pixel included in a second pixel area among the plurality of pixel areas, obtaining at least one first image of the user through a first camera disposed under the first pixel area, among the plurality of cameras, while the at least one first pixel is deactivated, and obtaining at least one second image of the user through a second camera disposed under the second pixel area, among the plurality of cameras, while the at least one second pixel is deactivated.

In an example embodiment, the obtaining of the final image may include obtaining, as the final image, an image having the least interference from among the at least one first image and the at least one second image.

In an example embodiment, the obtaining of the final image may include obtaining, as the final image, an image produced by integrating a portion of the at least one first image with the least interference and a portion of the at least one second image with the least interference.

In an example embodiment, the method may further include: obtaining at least one third image of the user through the first camera while the at least one first pixel is activated, obtaining at least one fourth image of the user through the second camera while the at least one second pixel is activated, and using interference information included in each of the at least one third image and the at least one fourth image as additional information for performing the authentication.

In an example embodiment, the obtaining of the at least one first image of the user may include: identifying whether a surrounding brightness value of the first pixel area is less than a threshold value based on the at least one first pixel being deactivated, controlling the at least one second pixel included in the second pixel area to emit a configured amount of light based on the surrounding brightness value of the first pixel area being less than the threshold value, and obtaining the at least one first image of the user through the first camera disposed under the first pixel area while the at least one second pixel is emitting the light.

In an example embodiment, the method may further include: changing the amount of light emitted from the at least one second pixel within a configured range based on the at least one first pixel being deactivated, collecting images through the first camera while the amount of light is changed within the configured range, based on the collected images, determining whether there is a change in a pupil of the user based on the changed amount of light, and determining whether an authentication object is a living body, based on the determination result.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
memory;
a display;
a plurality of cameras disposed under the display; and
at least one processor, comprising processing circuitry, operatively connected to the memory, the display, and the plurality of cameras,
wherein one or more of the at least one processor, individually and/or collectively, is configured to:
alternately activate and/or deactivate at least one first pixel included in a first pixel area among a plurality of pixel areas of the display corresponding to the plurality of cameras and at least one second pixel included in a second pixel area among the plurality of pixel areas;
based on the activation or deactivation, obtain, through the plurality of cameras, a plurality of images;
based on at least one of the plurality of images, obtain a final image; and
based on the final image, perform authentication of the user.

2. The electronic device of claim 1, wherein one or more of the at least one processor, individually and/or collectively, is configured to:
obtain at least one first image of the user through a first camera disposed under the first pixel area, among the plurality of cameras, while the at least one first pixel is deactivated; and
obtain at least one second image of the user through a second camera disposed under the second pixel area, among the plurality of cameras, while the at least one second pixel is deactivated.

3. The electronic device of claim 1, wherein one or more of the at least one processor, individually and/or collectively, is configured to obtain, as the final image, an image having a least interference from among the at least one first image and the at least one second image.

4. The electronic device of claim 1, wherein one or more of the at least one processor, individually and/or collectively, is configured to obtain, as the final image, an image produced by integrating a portion of the at least one first image with the least interference and a portion of the at least one second image with the least interference.

5. The electronic device of claim 1, wherein one or more of the at least one processor, individually and/or collectively, is configured to:
obtain at least one third image of the user through the first camera while the at least one first pixel is activated;
obtain at least one fourth image of the user through the second camera while the at least one second pixel is activated; and
use interference information included in each of the at least one third image and the at least one fourth image as additional information for performing the authentication.

6. The electronic device of claim 1, wherein one or more of the at least one processor, individually and/or collectively, is configured to:
identify whether a surrounding brightness value of the first pixel area is less than a threshold value based on the at least one first pixel being deactivated;
control the at least one second pixel included in the second pixel area to emit a configured amount of light based on the surrounding brightness value of the first pixel area being less than the threshold value; and
obtain the at least one first image of the user through the first camera disposed under the first pixel area while the at least one second pixel emits the light.

7. The electronic device of claim 1, wherein one or more of the at least one processor, individually and/or collectively, is configured to:
change an amount of light emitted from the at least one second pixel within a configured range based on the at least one first pixel being deactivated;
collect images through the first camera while the amount of light is changed within the configured range;
based on the collected images, determine whether there is a change in a pupil of the user based on the changed amount of light; and
determine whether an authentication object is a living body, based on the determination result.

8. A method of performing user authentication in an electronic device, the method comprising:
alternately activate and/or deactivate at least one first pixel included in a first pixel area among a plurality of pixel areas of a display of the electronic device corresponding to a plurality of cameras of the electronic device and at least one second pixel included in a second pixel area among the plurality of pixel areas;
based on the activation or deactivation, obtain, through the plurality of cameras, a plurality of images;
based on at least one of the plurality of images, obtaining a final image; and
based on the final image, performing authentication of the user.

9. The method of claim 8, further comprising:
obtaining at least one first image of the user through a first camera disposed under the first pixel area, among the plurality of cameras, while the at least one first pixel is deactivated; and
obtaining at least one second image of the user through a second camera disposed under the second pixel area, among the plurality of cameras, while the at least one second pixel is deactivated.

10. The method of claim 8, wherein the obtaining of the final image comprises obtaining, as the final image, an image having a least interference from among the at least one first image and the at least one second image.

11. The method of claim 8, wherein the obtaining of the final image comprises obtaining, as the final image, an image produced by integrating a portion of the at least one first image with the least interference and a portion of the at least one second image with the least interference.

12. The method of claim 8, further comprising:
obtaining at least one third image of the user through the first camera while the at least one first pixel is activated;
obtaining at least one fourth image of the user through the second camera while the at least one second pixel is activated; and using interference information included in each of the at least one third image and the at least one fourth image as additional information for performing the authentication.

13. The method of claim 8, wherein the obtaining of the at least one first image of the user comprises:

identifying whether a surrounding brightness value of the first pixel area is less than a threshold value based on the at least one first pixel being deactivated;

controlling the at least one second pixel included in the second pixel area to emit a configured amount of light based on the surrounding brightness value of the first pixel area being less than the threshold value; and obtaining the at least one first image of the user through the first camera disposed under the first pixel area while the at least one second pixel is emitting the light.

14. The method of claim 8, further comprising:

changing an amount of light emitted from the at least one second pixel within a configured range based on the at least one first pixel being deactivated;

collecting images through the first camera while the amount of light is changed within the configured range;

based on the collected images, determining whether there is a change in a pupil of the user depending on the changed amount of light; and determining whether an authentication object is a living body, based on the determination result.

15. A non-transitory computer-readable storage medium storing instructions, which, when executed by one or more of at least one processor of an electronic device, cause the electronic device to perform at least one operation, wherein the at least one operation comprises:

alternately activate and/or deactivate at least one first pixel included in a first pixel area among a plurality of pixel areas of a display of the electronic device corresponding to a plurality of cameras of the electronic device and at least one second pixel included in a second pixel area among the plurality of pixel areas;

based on the activation or deactivation, obtain, through the plurality of cameras, a plurality of images;

based on at least one of the plurality of images, obtaining a final image; and based on the final image, performing authentication of the user.

16. The non-transitory computer-readable storage medium of claim 15, wherein obtaining the plurality of images comprises:

obtaining at least one first image of the user through a first camera disposed under the first pixel area, among the plurality of cameras, while the at least one first pixel is deactivated; and obtaining at least one second image of the user through a second camera disposed under the second pixel area, among the plurality of cameras, while the at least one second pixel is deactivated.

17. The non-transitory computer-readable storage medium of claim 15, wherein obtaining the final image comprises:

obtaining, as the final image, an image having a least interference from among the at least one first image and the at least one second image.

18. The non-transitory computer-readable storage medium of claim 15, wherein the at least one operation comprises:

obtaining at least one third image of the user through the first camera while the at least one first pixel is activated;

at least one fourth image of the user through the second camera while the at least one second pixel is activated; and using interference information included in each of the at least one third image and the at least one fourth image as additional information for performing the authentication.

19. The non-transitory computer-readable storage medium of claim 15, wherein obtaining at least one first image of the user comprises:

identifying whether a surrounding brightness value of the first pixel area is less than a threshold value based on the at least one first pixel being deactivated;

controlling the at least one second pixel included in the second pixel area to emit a configured amount of light based on the surrounding brightness value of the first pixel area being less than the threshold value; and obtaining the at least one first image of the user through the first camera disposed under the first pixel area while the at least one second pixel emits the light.

20. The non-transitory computer-readable storage medium of claim 15, wherein the at least one operation comprises:

changing an amount of light emitted from the at least one second pixel within a configured range based on the at least one first pixel being deactivated;

collecting images through the first camera while the amount of light is changed within the configured range;

based on the collected images, determining whether there is a change in a pupil of the user based on the changed amount of light; and determining whether an authentication object is a living body, based on the determination result.

* * * * *